D. P. KELLOGG.
METHOD OF WELDING.
APPLICATION FILED MAR. 30, 1917.
1,327,099.
Patented Jan. 6, 1920.
5 SHEETS—SHEET 1.
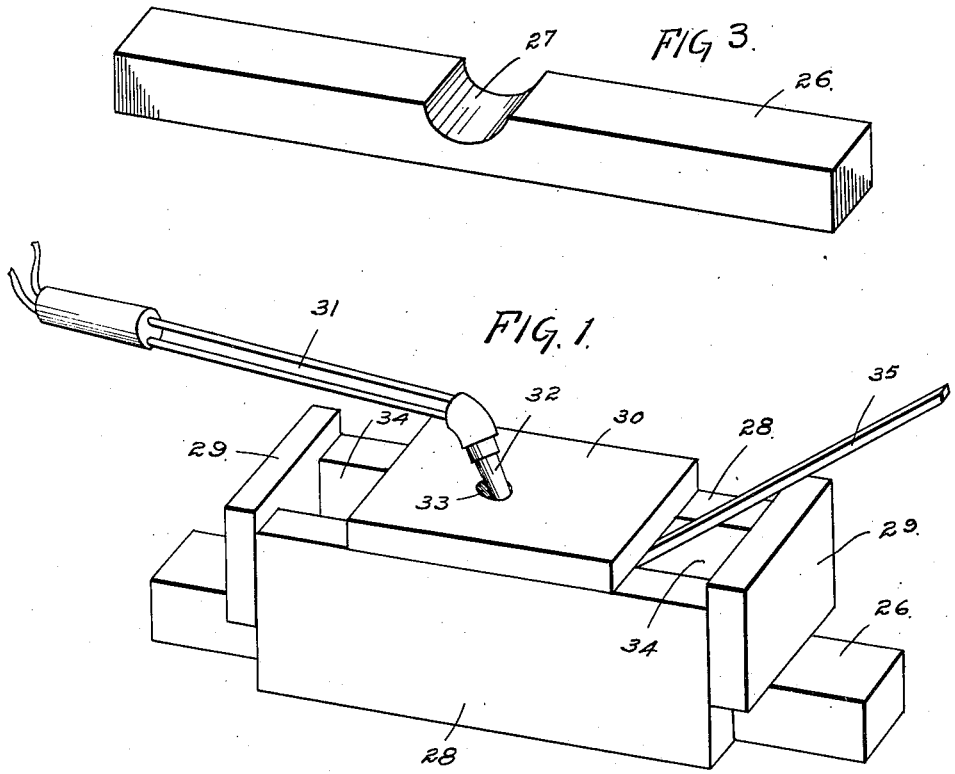
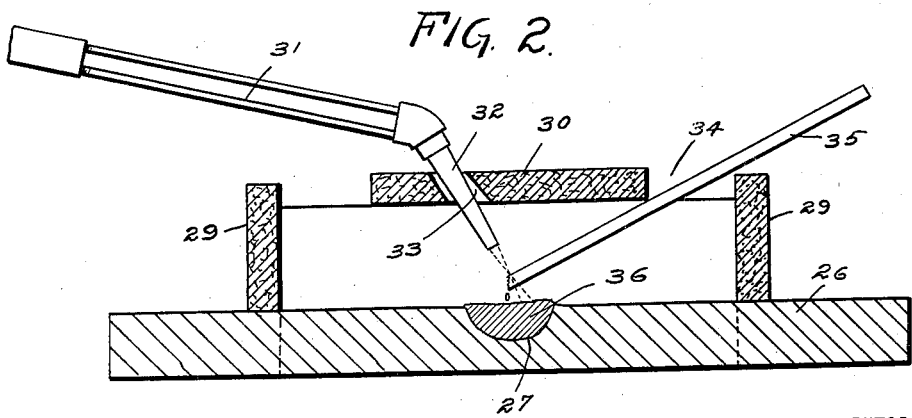
INVENTOR
Daniel P. Kellogg
BY
Barnett Truman
ATTORNEYS

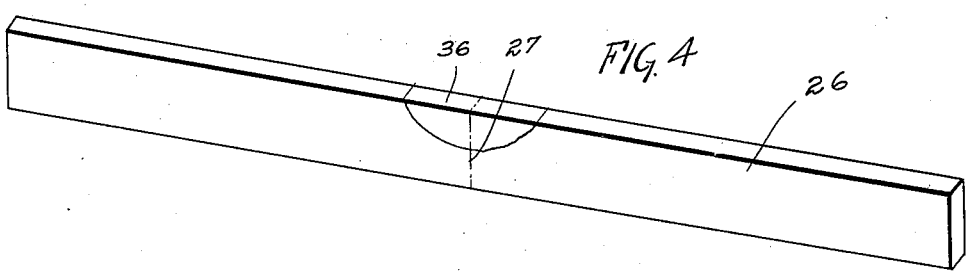
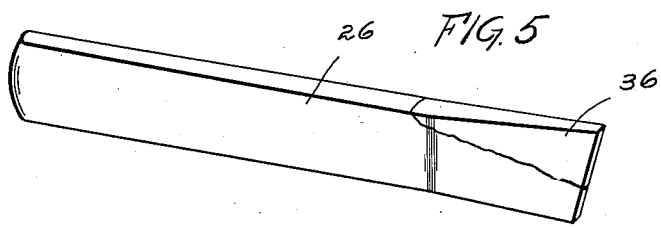
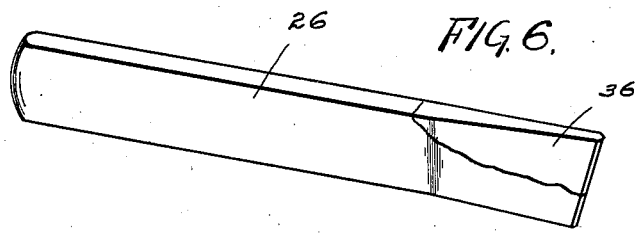
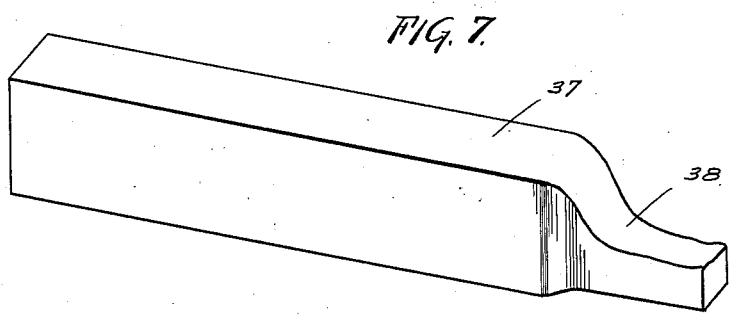
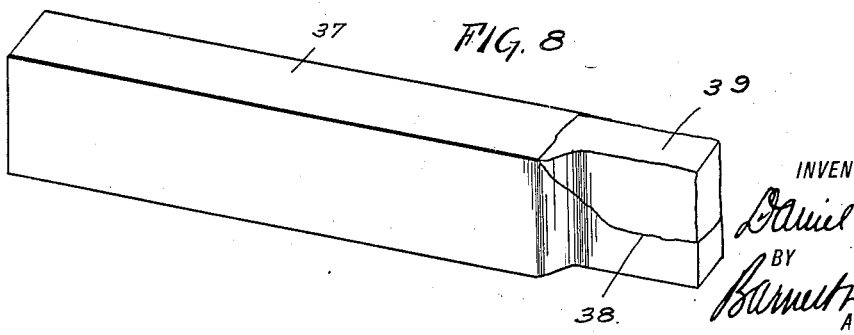

D. P. KELLOGG.
METHOD OF WELDING.
APPLICATION FILED MAR. 30, 1917.
1,327,099.
Patented Jan. 6, 1920.
5 SHEETS—SHEET 3.
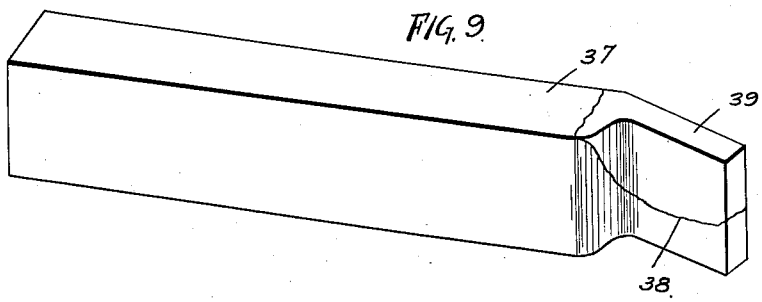
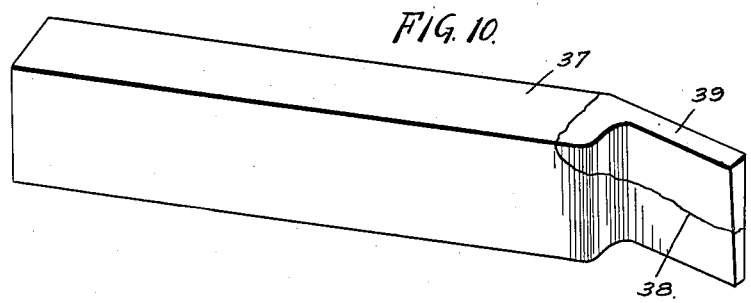
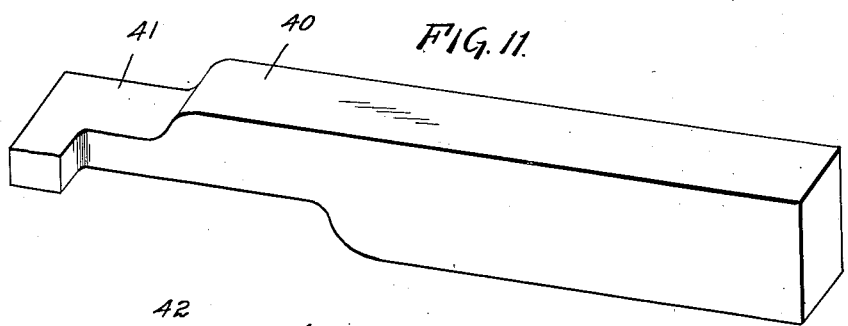
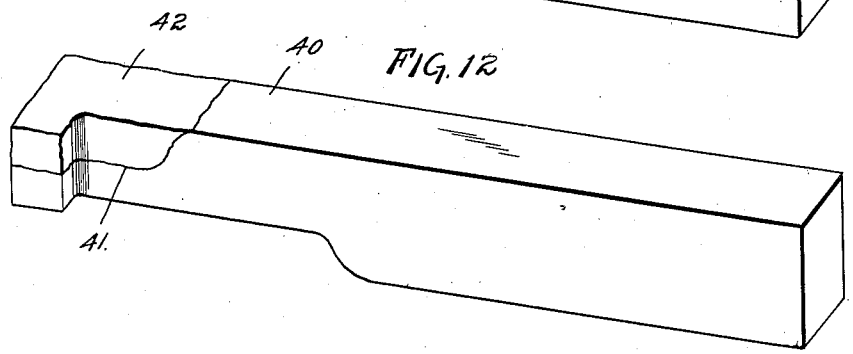
INVENTOR
Daniel P. Kellogg
BY
Barnett Jillman
ATTORNEYS.

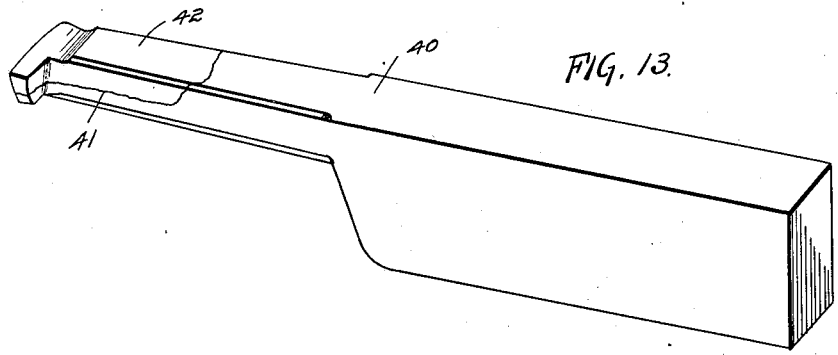
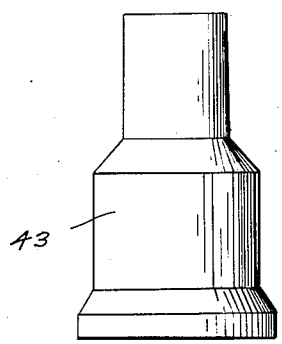
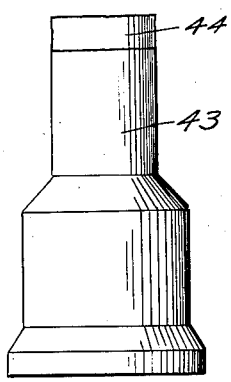
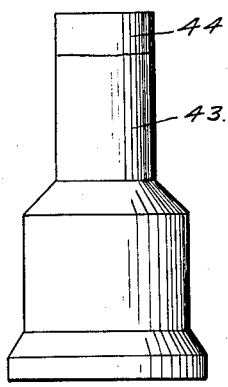
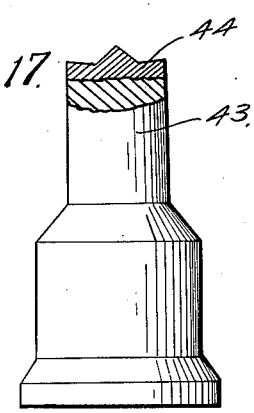
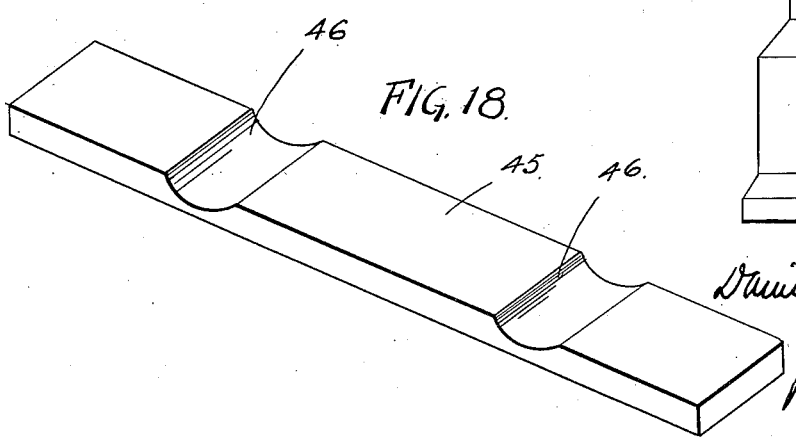

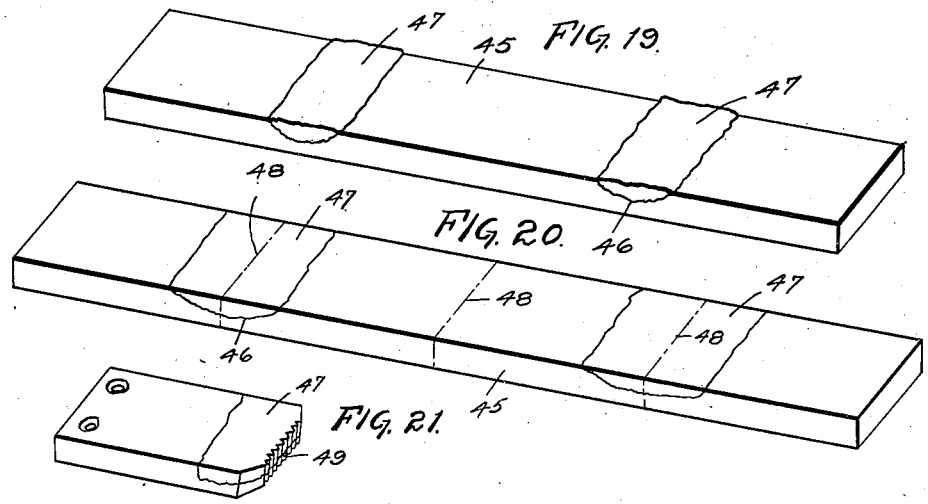
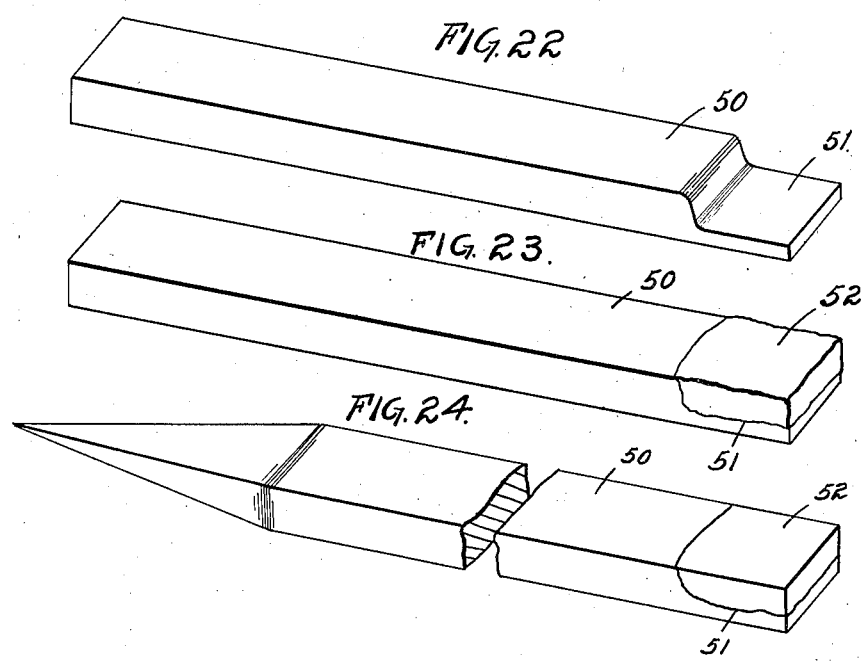
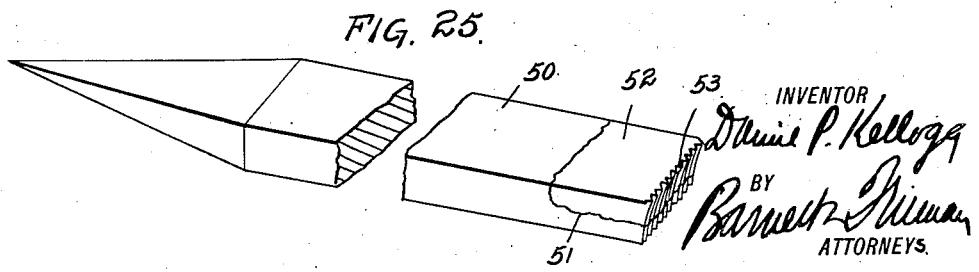

UNITED STATES PATENT OFFICE.

DANIEL P. KELLOGG, OF LOS ANGELES, CALIFORNIA.

METHOD OF WELDING.

1,327,099.   Specification of Letters Patent.   Patented Jan. 6, 1920.

Application filed March 30, 1917. Serial No. 158,595.

*To all whom it may concern:*

Be it known that I, DANIEL P. KELLOGG, a citizen of the United States, residing at Los Angeles, in the county of Los Angeles and State of California, have invented certain new and useful Improvements in Methods of Welding, of which the following is a specification.

My invention relates to the art of welding metals, and more particularly to the manufacture of tools having shanks, stocks or bodies of relatively soft metal, preferably steel, provided with facings, bits or cutting edges of harder steel, preferably the alloy known as "high speed" or "self-hardening" or "air hardening" steel; steel of this sort being made according to different formulæ by different manufacturers but having in general the same characteristics.

My present invention is an improvement on the joint invention disclosed in the copending application of myself and others, Ser. No. 57,767, filed October 25, 1915.

The principal object of my present invention is to provide a method whereby the welding operation is carried out in a retort or flame chamber. While it is particularly applicable to the manufacture of tools such as lathe and planing tools, reamers, punchers, drills, dies, and the like, the method will be found useful in the manufacture of other articles where it is imperative to produce a reliable weld between steels or other metals which cannot be satisfactorily welded by ordinary methods. In this aspect the invention is not limited to the manufacture of tools of the sort described.

The invention consists further in certain preferred methods of making the particular type of tools herein disclosed.

The invention is illustrated, in a preferred embodiment, in the accompanying drawings wherein—

Figure 1 is a view, in perspective, of the apparatus (the part with which my invention is concerned) for making a composite lathe tool.

Fig. 2 is a longitudinal sectional view of the apparatus.

Fig. 3 is a view, in perspective, of the body or stock of soft steel, or other metal, prepared to receive the bit or facing of high speed steel.

Figs. 4, 5 and 6 are perspective views to illustrate subsequent steps in the method of making the completed tool.

Figs. 7, 8, 9 and 10 are similar views illustrating the method of manufacturing a tool known as a cutting-off tool.

Figs. 11, 12 and 13 are views in perspective illustrating the application of the process of my invention to the manufacture of lathe boring tools.

Figs. 14, 15, 16 and 17 are views, in elevation, illustrating the production of a composite punch having a high speed steel cutting face.

Figs. 18, 19, 20 and 21 are perspective views illustrating the manufacture, in sets of four, of composite dies for bolt cutters, and Figs. 22, 23, 24 and 25 are similar views illustrating the method of making the tools known as thread chasers.

Like characters of reference designate like parts in the several figures of the drawings.

As a matter of convenience I shall refer to the element to which the high speed steel is united as the "stock," although literally the term "stock" might be more applicable to certain articles than to others; and in the same way, will refer to the body of high speed steel deposited on the stock as the "facing," although the term may not, strictly speaking, be applicable to all shapes that the body of high speed steel may take.

Referring first to Figs. 1 to 6 inclusive, the method of manufacturing the tool shown in these figures is preferably as follows:

The stock 26 is first formed with a groove or recess 27. It is then inclosed in a furnace or retort which is preferably made up of side blocks 28, end blocks 29 and a top block 30 of refractory material, such as fire brick, of a character to withstand the high temperatures employed without appreciable oxidation. Oxidation of the walls of the retort is likely to introduce impurities into the weld fatal to success. I preferably use for the retort a fire brick made by the Carborundum Company known to the trade as refrax brick.

The welding operation is accomplished preferably by an oxy-acetylene flame, or other high temperature flame of this type. 31 indicates the torch. The nozzle 32 of the torch is first thrust through the perforation 33 in the cover block 30, or through one of the end openings 34 in the top of the retort, and the surface of the recess is heated to the fusion point. It is desirable, particularly if the stock is large, to pre-heat it before the retort is built up around it. This may be done in any suitable furnace. When the surface of the recess has reached the point of fluidity a stick 35 of high speed steel is introduced into one of the openings in the retort, for example, through one of the end openings 34. The torch, in such case, projects through the opening 33 in the cover block. The end of the stick is melted by the flame within the inclosed space in the retort and the metal flows into the recess 27, filling the same, the deposit being indicated at 36. To get the best results it is desirable to preheat the weld stick. Preferably the oxyacetylene flame is not projected directly against the metal which is to be melted as this is likely to produce oxidation. The melting is brought about by the reverberation of the flames from the walls of the retort. By substantially inclosing the work a space is provided which is effectively filled by the flames so that air is excluded from the metal during the melting operation. This is desirable in certain operations. In some cases if the operation is performed in the open air the melted metal is likely to bubble or blister with the result that the facing of the high speed steel will not have the closeness of texture which is essential, but instead, will be spongy and filled with air holes.

When the recess has been filled the torch is withdrawn very slowly so that the intensity of the flame is diminished gradually. This is facilitated by the fact that the work is inclosed in the manner described. After the torch has been withdrawn it is desirable to throw some finely divided material, such as powdered charcoal, coke or coal over the weld. This protects the metal from the air and makes the cooling of the surfaces of the molten metal gradual.

After the article has cooled to a forging temperature (or it may be allowed to cool completely and be afterward re-heated) it is thinned down by hammering or rolling to the shape shown in Fig. 4. The purpose of this is not only to dress the blank to the shape required but also to improve the character of the facing and its weld to the stock. The working of the metal in this manner is in itself beneficial. The blank is then severed at line 27 and each half dressed successively to the shapes shown in Figs. 5 and 6, Fig. 6 showing the finished tool. If desired the character of the high speed steel facing may be modified or improved during the welding operation by adding to the pool of steel in the recess in the stock, while such steel is in molten condition, such alloying metals as cobalt or manganese. Such metals may be stirred into the molten steel by means of the welding stick.

Cutting-off tools, such as those shown in Figs. 7 to 10 inclusive, may be manufactured singly, the walls of the retort being shaped so as to bear against the sides and ends of the stock 37 so as to retain the melted high speed steel which is flowed upon the thinned end 38 of the stock, the deposit of high speed steel being indicated at 39. Fig. 7 shows the shape to which the blank is forged and Fig. 8, the blank after the facing has been united with it. The blank is then forged successively into the shapes shown in Figs. 9 and 10, Fig. 10 showing the tool in its finished condition.

The lathe boring tool, as illustrated in Figs. 11 to 13 inclusive, may be manufactured in the same way as the tool previously described. Fig. 11 shows the blank 40, the end of which is thinned down at 41 to receive the facing 42 of high speed steel. The tool is then forged to the shape shown in Fig. 13. In all of these tools the thinning down of the facing by rolling or hammering is effected with the object of improving the quality of the high speed steel facing and insuring the completeness and stability of the weld.

In Figs. 14 to 17 inclusive, is illustrated the method of making a composite punch. The blank 43 before facing is shown in Fig. 14. A suitable retort is built around the upper end of the blank and the high speed facing 44 united with the blank (Fig. 15). Fig. 16 shows the end of the blank thinned and elongated. After this operation has been performed the facing is cut to the final form shown in Fig. 17.

Figs 18 to 21 inclusive show the method of manufacturing threading tools for bolt cutters, these devices being preferably made in sets of four. The blank 45 is formed with two grooves or recesses 46 which are filled with bodies of high speed steel 47 (Fig. 19). The blank is then severed along the lines 48, 48, 48 and the facing of each of the four tools is cut to form teeth 49.

The thread chaser shown in Figs. 22 to 25 inclusive, is made in substantially the manner described in connection with the tools shown in Figs. 7 to 13 inclusive. The blank 50 is thinned at one end, as shown at 51, by forging or otherwise. The facing 52 is united with the blank (Fig. 23) and the blank then dressed successively to the shapes shown in Figs. 24 and 25, and teeth 53 formed in the cutting edge as shown in the latter figure.

I claim:

1. The method of uniting a high speed steel facing with a stock of softer steel which consists in reducing to fluidity the high speed steel and the surface of the stock to which it is to be united by means of a flame applied within a space sufficiently inclosed so that the space is filled with flame and air thereby excluded from contact with the work.

2. The method of uniting a high speed steel facing with a stock of softer steel which consists in reducing to fluidity the high speed steel and the surface of the stock to which it is to be united by means of a flame applied within a space sufficiently inclosed to exclude air from contact with the work and gradually withdrawing the flame from the work after the molten high speed steel has been deposited on the stock.

3. The method of uniting a high speed steel facing with a stock of softer steel which consists in reducing to fluidity the high speed steel and the surface of the stock to which it is to be united by means of a flame applied within a space sufficiently inclosed to exclude air from contact with the work and gradually withdrawing the flame from the work after the molten high speed steel has been deposited on the stock, and thereupon covering the facing with a finely divided material to exclude the air during the cooling operation.

4. The method of uniting a high speed steel facing with a stock of softer steel which consists in reducing to fluidity the high speed steel and the surface of the stock to which it is to be united by means of a high temperature gas flame of the oxy-acetylene type applied within a space sufficiently inclosed so that the space is filled with flame thereby excluding air from contact with the work.

5. The method of uniting a high speed steel facing with a stock of softer steel which consists in inclosing the metals in a retort having refractory walls, melting the part of the surface of the stock to which the facing is to be applied, and completely melting the high speed steel by a flame applied indirectly to the metal by reverberation from the walls of the retort which fills the retort so as to exclude air from the work.

6. The method of forming a hard metal facing on a stock of softer metal which consists in reducing to fluidity the facing metal and the surface of the other, and flowing the former on the latter within a space sufficiently inclosed to exclude air from the metals, and mixing an alloying metal with the facing metal while the deposit thereof on the stock is in fluid condition.

7. The method of uniting the facing of a high speed steel to a stock of softer metal which consists in inclosing the stock in a retort having refractory walls, melting the surface of the stock by a high temperature flame of the oxy-acetylene type which substantially fills the retort with flame so as to maintain a pressure above atmospheric within the retort to exclude air from contact with the work, then thrusting a piece of high speed steel into the retort, melting a portion of the same and flowing it over the melted surface of the stock.

8. The method of uniting the facing of a high speed steel to a stock of softer metal which consists in inclosing the stock in a retort having refractory walls, melting the surface of the stock by a high temperature flame of the oxy-acetylene type which substantially fills the retort with flame so as to exclude air from contact with the work, then thrusting a piece of high speed steel into the retort, melting a portion of the same and flowing it over the melted surface of the stock, and after the melting of the metal is complete, withdrawing the flame slowly from the retort.

9. The method of uniting the facing of a high speed steel to a stock of softer metal which consists in inclosing the stock in a retort having refractory walls, melting the surface of the stock by a high temperature flame of the oxy-acetylene type which substantially fills the retort with flame so as to exclude air from contact with the work, then thrusting a piece of high speed steel into the retort, melting a portion of the same and flowing it over the melted surface of the stock and after the melting of the metal is complete withdrawing the flame slowly from the retort, and covering the deposit of high speed steel with finely divided material.

10. The method of uniting the facing of a high speed steel to a stock of softer metal which consists in forming a recess in the stock, inclosing the stock in a retort having refractory walls, melting the surface of the stock by a high temperature flame of the oxy-acetylene type which substantially fills the retort with flame so as to exclude air from contact with the work, then thrusting a piece of high speed steel into the retort, melting a portion of the same and flowing it into said recess.

11. The method of making a compound tool having a high speed steel cutting edge and a soft metal stock which consists in forming the stock with a recess, melting the surface of said recess by a high temperature flame, melting a piece of high speed steel and flowing it into the recess to fill the same, and after the article has cooled, cutting the same so as to expose an edge of the high speed steel.

12. The method of making compound tools having high speed steel cutting edges and soft metal stocks which consists in forming the soft metal blank with a recess, melting the surface of said recess by a high temperature flame, melting a piece of high speed steel and flowing it into the recess to fill the same, and after the blank has cooled severing the same across the deposit of high speed steel so as to form two tools from the blank.

13. The method of making a compound tool having a high speed steel facing provided with a cutting edge and a soft metal stock which consists in forming the stock with a recess, melting the surface of said recess by a high temperature flame, melting a piece of high speed steel and flowing it into the recess to fill the same, forging the welded portion of the article to thin down the facing, and cutting the article so as to expose an edge of the facing.

14. The method of uniting a high speed steel facing with a stock of softer steel which consists in fusing the surface of the stock and melting the high speed steel and applying it drop by drop to the fused surface of the stock within a space sufficiently inclosed so that it is filled with flame and air thereby excluded from contact with the work.

DANIEL P. KELLOGG.